US012674711B2

(12) United States Patent　　(10) Patent No.: US 12,674,711 B2
Mottas　　(45) Date of Patent: Jul. 7, 2026

(54) ANALOG NEGATIVE TEMPERATURE COEFFICIENT (NTC) COMPENSATION

(71) Applicant: BELIMO Holding AG, Hinwil (CH)

(72) Inventor: Yoram Mottas, Lentigny (CH)

(73) Assignee: BELIMO Holding AG, Hinwil (CH)

( * ) Notice: Subject to any disclaimer, the term of this patent is extended or adjusted under 35 U.S.C. 154(b) by 388 days.

(21) Appl. No.: 18/488,680

(22) Filed: Oct. 17, 2023

(65) Prior Publication Data

US 2024/0133752 A1　Apr. 25, 2024
US 2024/0230424 A9　Jul. 11, 2024

(30) Foreign Application Priority Data

Oct. 19, 2022　(CH) ............................... 001235/2022

(51) Int. Cl.
*G01K 7/24*　(2006.01)

(52) U.S. Cl.
CPC ...................................... *G01K 7/24* (2013.01)

(58) Field of Classification Search
CPC ................................... G01K 7/24; G01K 1/20
See application file for complete search history.

(56) References Cited

U.S. PATENT DOCUMENTS

| | | | | |
|---|---|---|---|---|
| 4,276,536 A | * | 6/1981 | Wisnia | G01F 23/247 |
| | | | | 338/23 |
| 10,209,688 B2 | | 2/2019 | Stefanski et al. | |
| 2011/0119018 A1 | * | 5/2011 | Skarp | G01K 7/42 |
| | | | | 702/130 |
| 2015/0130531 A1 | * | 5/2015 | Tadinada | G05F 5/00 |
| | | | | 438/54 |

| | | | | |
|---|---|---|---|---|
| 2021/0349485 A1 | * | 11/2021 | Ng | F24F 11/30 |
| 2022/0026086 A1 | | 1/2022 | Martinez et al. | |
| 2022/0268721 A1 | * | 8/2022 | Kummaraguntla | G01N 27/14 |

FOREIGN PATENT DOCUMENTS

| | | | | | |
|---|---|---|---|---|---|
| EP | 0856726 B1 | * | 9/2001 | | G01L 19/04 |
| EP | 0980139 B1 | * | 4/2002 | | H03K 17/94 |
| JP | S60144632 A | * | 7/1985 | | |
| JP | H11316167 A | * | 11/1999 | | |
| JP | 2002116053 A | * | 4/2002 | | |
| JP | 2013239153 A | * | 11/2013 | | G05F 1/567 |
| KR | 960004255 B1 | * | 3/1996 | | G01K 1/20 |
| TW | I444806 B | * | 7/2014 | | H02M 3/1588 |

OTHER PUBLICATIONS

Chad Terry, "Temperature Sensor for Control and Compensation Circuits", Jan. 22, 2016, retrieved from https://web.archive.org/web/20161205054449/http://www.ametherm.com/blog/thermistors/temperature-sensor-control-compensation-2/.

* cited by examiner

*Primary Examiner* — Laura Martin
*Assistant Examiner* — Julia Fitzpatrick
(74) *Attorney, Agent, or Firm* — Kolitch Romano Dascenzo Gates LLP

(57)　　　　ABSTRACT

A room operating unit (ROU) which is integral part of a HVAC system has an operating unit providing different functionalities, a device terminal and an analog sensor unit including an electrical circuit for determining room temperature. Depending on the construction of the device, self-heating effects caused by the heat generating components of the device may affect the result of the temperature measurement, i.e., the ambient temperature of the sensor unit may be higher than room temperature. Therefore, the sensor unit comprises a compensation circuit for correcting the temperature output by the sensor unit by eliminating self-heating effects.

13 Claims, 5 Drawing Sheets

Figure 1:
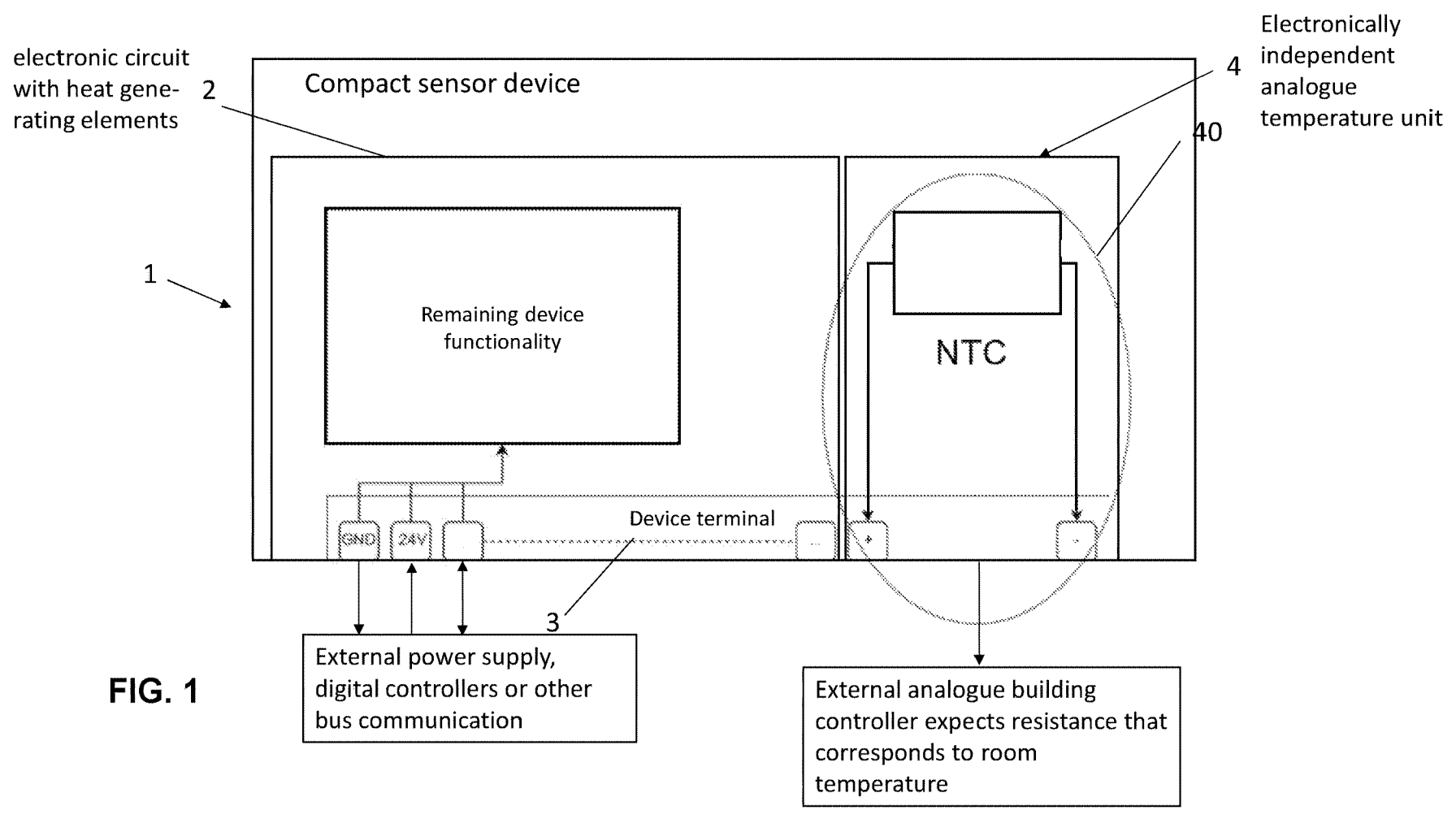

Electronically independent analogue temperature unit

4

40

Compact sensor device electronic circuit with heat gene-rating elements

2

NTC

External analogue building controller expects resistance that corresponds to room temperature Remaining device functionality Device terminal

3

GND

24V

External power supply, digital controllers or other bus communication

$$R_{eq} = R_{NTC10K} + R_{NTC200}$$

$$R_{eq} = R1 + R2$$

Multisensor PM 2.5 & RH/T & CO2

ANALOG NEGATIVE TEMPERATURE COEFFICIENT (NTC) COMPENSATION

TECHNICAL FIELD

The application relates to heating, ventilation, and air-conditioning (HVAC) systems of buildings, in particular residential buildings, office buildings, commercial buildings, and industrial buildings.

BACKGROUND

In the field of heating, ventilation and air-conditioning systems (HVAC) of buildings, in particular residential buildings, office buildings, commercial buildings and industrial buildings, temperatures and other parameters are measured and controlled manually or automatically. Particularly, the HVAC system may comprise one or a plurality of operating devices, e.g. room operating units (ROUs) for setting e.g. the desired room temperature and/or other parameters, and/or measuring devices, e.g. sensor devices. Since control of the parameters of a HVAC system requires a relatively exact determination of the room temperature, these devices and systems usually have a temperature sensor unit. Furthermore, in some setups external control devices expect an analog value of a room operating unit as representative for the measured temperature. In compact sensor design such as the aforementioned room operating units other electronic components in the near proximity of the temperature sensor lead to self-heating effects and the analog temperature sensor may have an offset in the output signal.

The temperature sensor unit may, for example, comprise a negative temperature coefficient (NTC) thermistor. The thermistor provides an unaltered analog NTC signal (signal referring or corresponding to an electrical resistance) directly to the pins of the already configured controller. The controller may be a low-cost controller configured with a single operation characteristic of the thermistor. Generally, the measured resistance of a thermistor depends on the ambient temperature of the thermistor and decreases with rising temperature. Different NTCs have different operation characteristics.

However, most operating devices (e.g. ROUs) and/or measuring devices (e.g. sensor devices) comprise components that generate heat, e.g. active components like sensors, microprocessors, etc. Since the thermistor is integrated in the ROU or sensor unit it is usually placed near the heat-generating components. Consequently, there is a self-heating (or internal heating) effect. Due to the self-heating effect the result of measurement may have a systematic bias/offset showing a measured temperature higher than room temperature.

In order to correct or compensate this offset, it has been proposed using a plurality of ambient temperature sensors in different places and extrapolate an ambient temperature from the measurements. However, most methods for compensating errors require electronics and software code, whereas some external controllers simply require a self-compensated analog output of the temperature sensor.

SUMMARY

The present disclosure provides a device comprising at least one heat generating component, wherein the device has an analog temperature sensor unit comprising an electrical circuit comprising a first resistor having a negative temperature coefficient (first NTC resistor) and a first operation characteristic referring or corresponding to a relation between the ambient temperature of the first resistor and a first electrical resistance (R1) of the resistor. Furthermore, the application relates to a method of determining room temperature using an analog sensor unit which is in proximity to a component of a device generating heat, comprising a step of determining a first electrical resistance (R1) using a first NTC resistor arranged in the device.

It is an object of the present disclosure to provide a compact device comprising at least one heat generating component and an analog temperature sensor unit, and a method of determining room temperature, derived from a temperature within the compact device, without requiring high technical expenditure.

This object is attained by providing a device comprising at least one heat generating component, wherein the device has a temperature sensor unit comprising an electrical circuit comprising:

a first resistor having a negative temperature coefficient (first NTC resistor) and a first operation characteristic referring or corresponding to a relation between the ambient temperature of the first resistor and a first electrical resistance (R1) of the resistor; and a compensation circuit comprising at least a second resistor, particularly a second resistor having a negative temperature coefficient (second NTC resistor), wherein the compensation circuit has a second operation characteristic referring or corresponding to a relation between the ambient temperature of the compensation circuit and a second electrical resistance (R2) of the compensation circuit;

wherein the compensation circuit is provided for compensating a deviation, caused by self-heating effects of the device, of the measured first electrical resistance (R1) from the electrical resistance referring room temperature.

The temperature sensor unit comprises an NTC sensor and a compensation circuit.

The resistors described in this application may be thermistors, which are types of resistors used to measure temperature changes based on their operation characteristic, i.e., a change in the electrical resistance relates to a change in the ambient temperature. Particularly, negative temperature coefficient (NTC) resistors are used in the present disclosure, but the compensation circuit may comprise as well positive temperature coefficient (PTC) resistors/thermistors.

In conventional devices, analog circuits are used for measuring the temperature. The output of these analog circuits is usually a resistance. In some applications for processing the output in a control unit, digital signals are needed. The resistance is usually measured as an analog voltage value and the voltage value may be transformed into a digital signal via an analog-digital (A/D) converter for further processing.

Usually, the application refers to a device or area, where space is limited and unwanted heat generation impacts the temperature measurement e.g. of a passive sensor like an NTC thermistor. The device may be e.g. a room sensor, room operating unit (ROU), a thermostat, an arrangement of sensors in close proximity to each other like a duct sensor with multiple sensor modules, e.g. CO2, VOC, PM, relative humidity (with heating function) sensor elements, wherein an NTC resistor for measuring the temperature is close to the arrangement. Therefore, the measurement is affected by the heat generated by active components like sensor elements, power converters, microcontrollers, etc. However, most applications require accurate reading within a predetermined tolerance band, e.g. of +/−0.25 K at 25° C.

In the prior art there are no methods for compensating the NTC thermistor. In fact, all manufacturers simply indicate the characteristics of the chosen NTC in a datasheet. As most devices have been quite simple (with very little or virtually no self-heating effects) using NTC thermistors without compensation used to be sufficient. However, as devices are getting more and more complex with more intelligence, several sensor elements or modules such as CO2 sensors in the same small enclosure cause higher self-heating effects, and therefore compensation is required. The present invention proposes an analog self-heating compensation for NTC resistors in the device, thus providing stable and accurate determination of the room temperature.

Another advantage of the present disclosure is that, despite having temperature compensation, standard SMD (surface mount device or surface mounting device) NTC elements may be used, which are simple and reliable.

Furthermore, software-wise correction and direct compensation in the analog measuring path may be avoided.

Self-heating effects and thus the requirements of a compensation circuit depend on the construction and the arrangement of the components of the device as well as supply/operation voltage of the device. If the supply voltage is determined the self-heating effects can be reduced to a function of the temperature.

Practically, a method (and/or a system) for self-heating compensation in a ROU (and/or a room sensor) using an analog NTC (Negative Temperature Coefficient) sensor unit. The compensation circuit comprises, in most cases, an analog passive/secondary NTC sensor soldered on the same PCB (printed circuit board) of the unit. The compensation circuit may comprise other components arranged in parallel or in series with the second NTC resistor in order to obtain even better accuracy. Generally, the compensation circuit is adapted to have, at a certain temperature of a (predetermined) relevant temperature band, a resistance that corresponds to the deviation of the first resistance from a resistance referring or corresponding to room temperature, caused by self-heating effects inside the device (e.g., room sensor). The analog output signal of the temperature sensor unit is transferred directly to the pins of a terminal of the device and used by an already configured controller. No major changes have to be made in the device when including the inventive compensation circuit, e.g. during commissioning including wiring to an already configured standard controller.

The inventive solution is simple and the first NTC resistor and the compensation circuit can be soldered on the same PCB. There is no need to separate the components of the sensor. In addition, temperature response times of the first NTC and the compensation circuit are the same.

In a preferred embodiment of the present disclosure a second resistance (R2) of the compensation circuit at a predetermined temperature represents the deviation of the measured first electrical resistance (R1) at the predetermined temperature from the electrical resistance referring or corresponding to ambient room temperature.

It is preferred that the compensation circuit is arranged in series with the first resistor, parallel to the first resistor, or in a network including the first resistor.

In a preferred embodiment of the present disclosure the compensation circuit compensates the deviation of the measured first electrical resistance at a first temperature from the electrical resistance referring or corresponding to room temperature, by adding a second electrical resistance at the first temperature to the temperature dependent resistance of the first resistor at the first temperature. The second electrical resistance represents self-heating effects of the device at the first temperature.

The compensation circuit may substantially consist of a second (NTC) resistor connected in series with the first resistor.

The additional passive sensor element is not evaluated by the microcontroller separately, but the sum of the first resistance and the second resistance is evaluated by the third party controller of a room or zone. The measured result of the passive (resistance) temperature sensor shall be directly provided to the terminal of the device, i.e. there is a two-wire connection. Alternatively, there may be a three or four wire connection.

The at least one heat generating component, the first resistor, and/or the compensation circuit may be in close proximity to each other.

In a preferred embodiment of the present disclosure the at least one heat generating component, the first resistor, and/or the compensation circuit may be arranged in a housing.

The object of the present disclosure is also attained by a method of determining room temperature using an analog sensor unit, particularly a sensor unit as described above, which is in proximity to a component of a device generating heat, comprising the steps of:

(a) determining a third electrical resistance (Req) which is a combination of a first electrical resistance (R1) arranged in the device, and a second electrical resistance (R2) of a compensation circuit;

(b) determining a temperature based on the third electrical resistance (Req) which corresponds to room temperature by compensating self-heating effects of the components of the device.

The first resistance may be the resistance of a first resistor or a circuit comprising at least a first resistor. The second resistance may be the resistance of a second resistor or a circuit comprising at least a second resistor.

In step (a) the first electrical resistance (R1) and the second electrical resistance (R2) of the compensation circuit may be added.

The first resistor and/or the second resistor may be NTC (negative temperature coefficient) resistors.

Step (b) may include using a first operation characteristic referring or corresponding to a relation between the ambient temperature of the first resistor and the first electrical resistance (R1) in order to determine a third temperature (Teq) relating to added values of the first electrical resistance (R1) and the second electrical resistance (R2). R1 represents the device temperature, i.e. the temperature measured within the device, and R2 represents self-heating effects. $R_{eq}$ is determined to correspond to room temperature (which is the temperature outside the device, possibly outside a housing of the device). In a simple temperature sensor unit $R_{eq}$=R1+R2.

Usually, the second resistor has an electrical resistance smaller than the electrical resistance of the first resistor. For example, the first resistance may be approximately 10 kΩ at 25° C., and the second resistance may be approximately 100 Ω at 25° C.

BRIEF DESCRIPTION OF THE DRAWINGS

The present disclosure will be explained in greater detail with reference to the exemplary embodiments which are illustrated in the drawings.

FIG. 1 is a schematic view of a room operating unit (ROU) according to the present disclosure;

DETAILED DESCRIPTION

Figure 3:
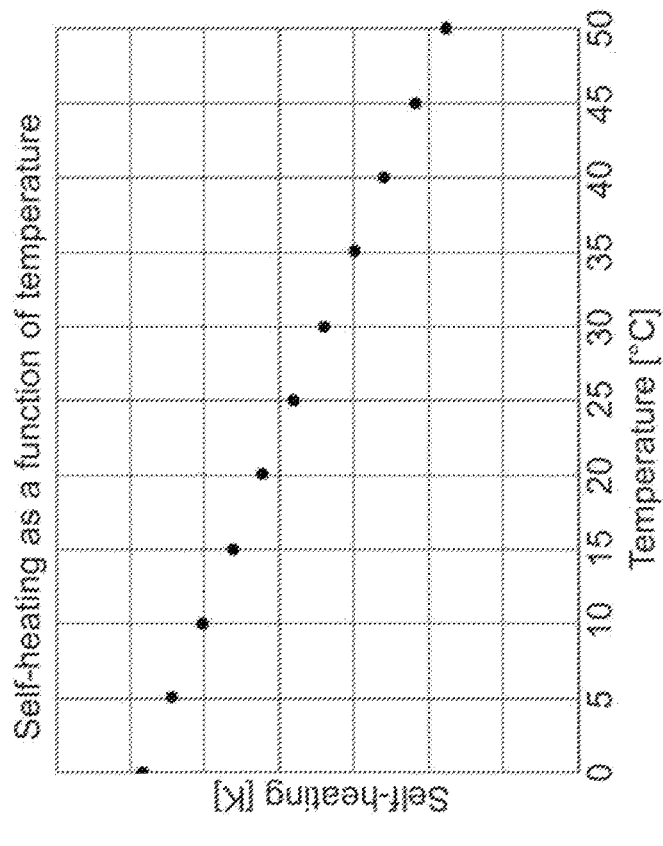
FIG. 3 is a diagram illustrating a dependency of the self-heating effect of a device depending on the ambient temperature.

FIG. 1 illustrates a compact sensor or actuation device, e.g., a room operating unit (ROU) 1, which is integral part of a HVAC system. The ROU (device) 1 has an operating unit 2 providing different functionalities, e.g. measuring room conditions, bus communication functions, control functions, etc. The operating unit 2 includes a device terminal 3 having a plurality of terminals, like a voltage supply terminal (e.g 24V), a ground terminal (GND) and a bus terminal. The terminals may be connected with a power source, an external control or other devices that provide digital communication. The operating unit 2 is an electronic device having one or a plurality of heat sources.

Furthermore, the room operating unit 1 comprises an analog temperature sensor unit 4 which comprises an electrical circuit 40 for determining the room temperature.

Depending on the installation space available the operating unit 2 and the sensor unit 4 may be arranged in proximity to each other. In order to provide a compact design, the operating unit 2 and the sensor unit 4 are arranged in a housing of the ROU 1. I. e. the operating unit 2 and the sensor unit 4 are enclosed in a common housing. Depending on the construction of the device 1 self-heating effects generated by the heat generating components of the operating unit 2 (whereas the sensor unit 4 is a passive device) may cause the temperature of the sensor unit 4, i.e., the temperature measured in the common housing, to be higher than room temperature (e.g., outside the common housing). On the other hand, any external building control expects a compensated analog signal which is not the measured temperature (i.e. in the device), but a temperature corresponding to room temperature. Therefore, the electronic circuit 40 of the sensor unit 4 outputs a compensated temperature corresponding to room temperature.

Figure 2:
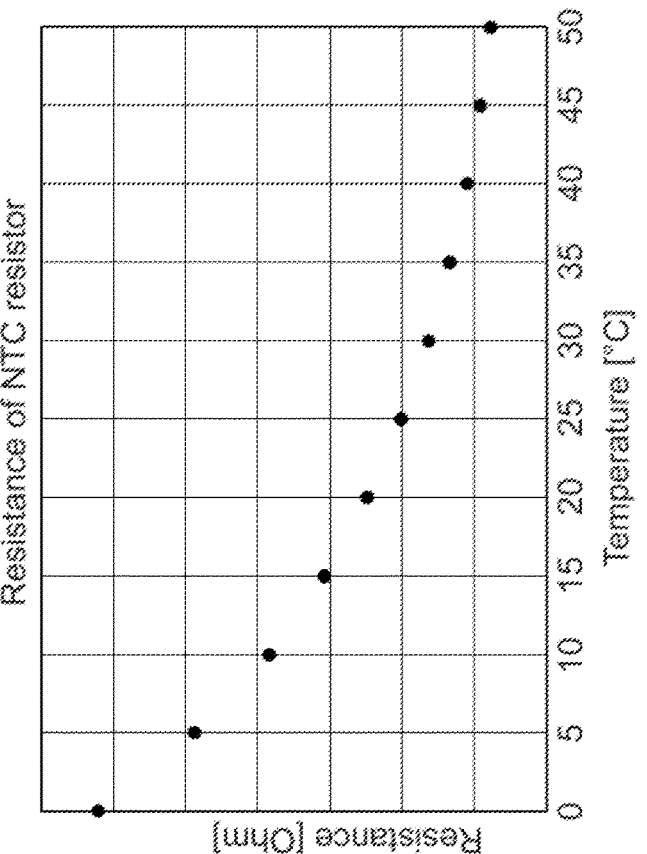
FIG. 2 is a diagram illustrating an operation characteristic of an NTC resistor.

FIG. 2 shows an operation characteristic of two different NTC resistors. According to FIG. 2 the electrical resistance decreases with rising temperature. I.e. in case there were self-heating effects the sensor unit 4 would, without a compensation/correction circuit, determine a lower resistance value, and thus indicate a higher temperature than room temperature.

FIG. 3 shows the effect of self-heating of a particular device 1. The deviation of the temperature measured by the sensor unit 4 (ambient temperature of the sensor unit 4) and room temperature (ambient temperature of the device 1) deceases with increasing absolute temperature. Therefore, when compensating the deviation, a higher correction value is needed at lower temperatures.

Figure 4:
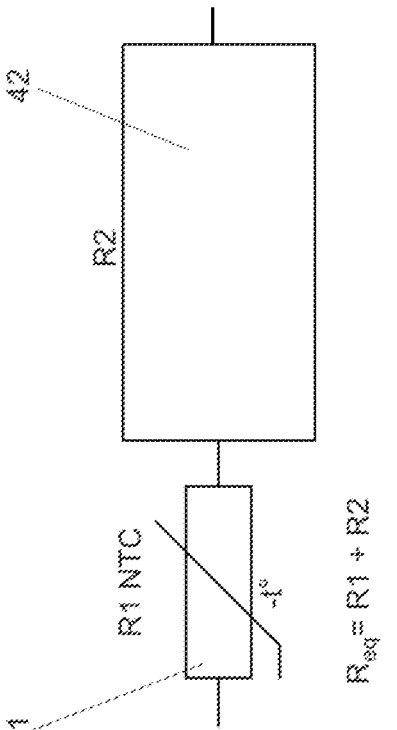
FIG. 4 is a schematic view of a first electrical circuit of a device according to the present disclosure.

FIG. 4 is a schematic view of an electrical circuit 40 of a device 1 according to the present disclosure. The electric circuit 40 comprises a negative temperature coefficient (NTC) resistor (NTC thermistor) 41 and a compensation circuit 42. The NTC resistor 41 outputs a first resistance value R1 that corresponds to the measured temperature in the device (including self-heating effects) of the NTC resistor 41. The compensation circuit 42 outputs a second resistance value R2 that corresponds to the self-heating effects of the device 1. Since the measured temperature of the NTC resistor 41 exceeds room temperature by a value corresponding to the self-heating effect shown in FIG. 3 at the ambient temperature of the sensor unit 4, the electrical resistance output by the NTC resistor 41 is lower than the electrical resistance output by the NTC resistor 41 would be when indicating room temperature. Therefore, the compensation circuit 42 is adapted to output at the particular ambient temperature of the compensation circuit 42 (and the first resistor 41) a resistance value R2 that corresponds to the self-heating effect. When adding the first resistance value R1 and the second resistance value R2, the resulting value Req corresponds to room temperature. When transposing the resistance into temperature the correct formula or table is used.

Figure 5:
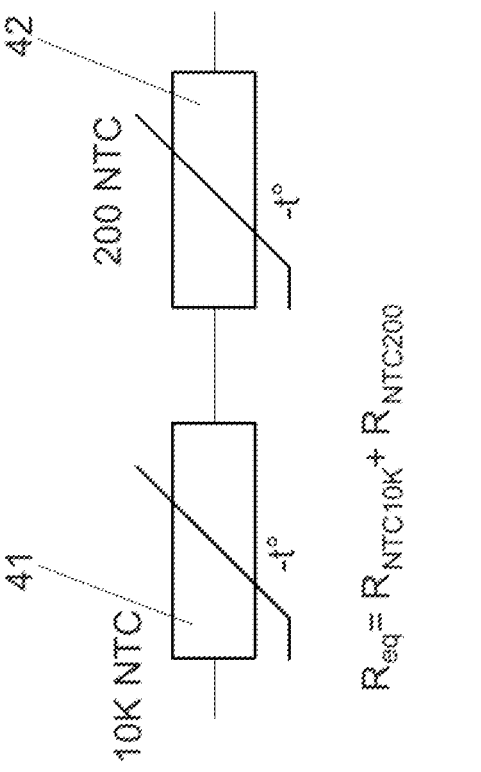
FIG. 5 is a schematic view of second electrical circuit of a device according to the present disclosure.

In the example illustrated in FIG. 5 the compensation circuit 42 is a second negative temperature coefficient (NTC) resistor having an operation characteristic showing decreasing resistance values with increasing temperature values. Thus, considering decreasing self-heating effects according to FIG. 3 the value R2 to be added to R1 decreases with increasing temperatures. Therefore, adding R1+R2 and taking Req as a determined value compensates self-heating effects.

Figure 6:
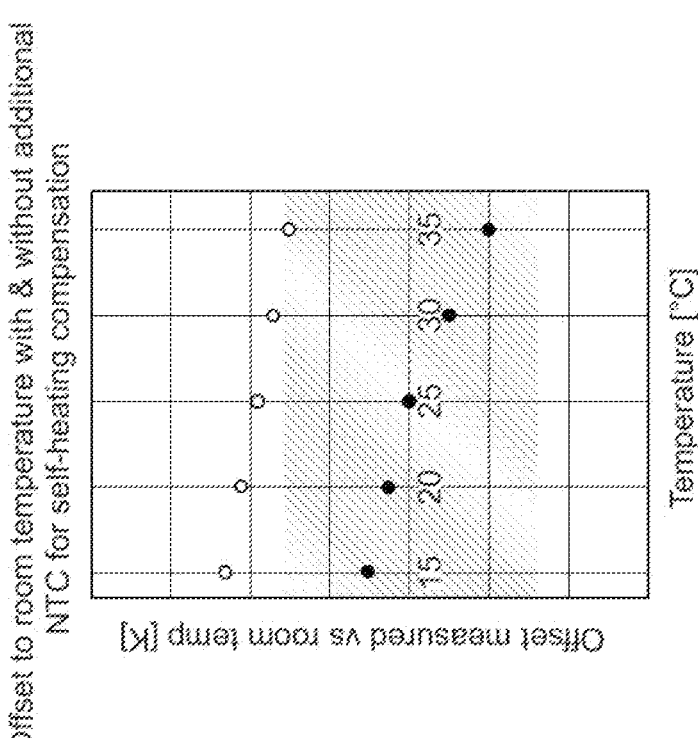
FIG. 6 is a diagram illustrating the effect of self-heating of a room operating unit (ROU) with and without using an inventive compensation circuit.

FIG. 6 shows the effects of compensation of self-heating effects in a device 1 according to the present disclosure.

The upper measuring points correspond to the values of FIG. 3, i.e., the deviation of the temperature due to self-heating effects at various absolute temperatures. The lower measuring points correspond to temperature deviations of the compensated/corrected temperature values Req output by the sensor unit 4.

In fact, the operation characteristic of the compensation circuit 42 has to be adapted to correspond to the effect of increasing temperature due to self-heating at every temperature within a temperature range which is relevant for HVAC applications. Such a temperature range may be 5° C. to 40° C. Within this range the deviation of the ambient temperature determined by the sensor unit 4 and the exact ambient temperature of the device 1 has to be within a predetermined tolerance band. In the present example the tolerance band is +/−0.25 K above and below room temperature. It can be seen in FIG. 6 that the deviations of the corrected temperature values are within the tolerance band in the relevant temperature interval.

Of course, the relevant temperature interval and/or the tolerance band may be set to different values. In this case, the compensation circuit may have to be adapted in a way that the operation characteristic of the compensation circuit 42 complies with the requirements on measurement accuracy of the temperature.

Figure 7:
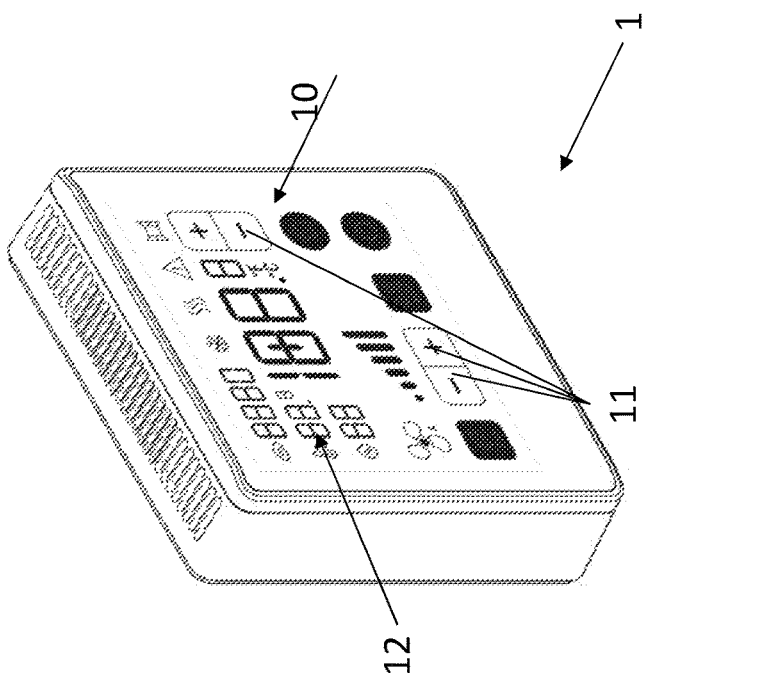
FIG. 7 is an illustration of a room operating unit according to the present disclosure.

FIG. 7 shows a ROU 1 having a housing 10 with an operating unit and a sensor unit as described above included in the housing 10, actuator buttons 11 and a display 12. There are terminals of the operating unit and terminals of the analog sensor unit for outputting the corrected values relating to room temperature. The ROU is a compact unit having a sensor unit including a compensation circuit based on SMD NTC basis which is integrated in the housing 10. Particular wiring is not necessary.

The present disclosure primarily has been described in connection with a room operating unit. However, the present disclosure may be used in connection with any applications in which areas of limited space and unwanted heat generation affect the measurement of the temperature of a passive sensor like an NTC resistors.

Figure 8:
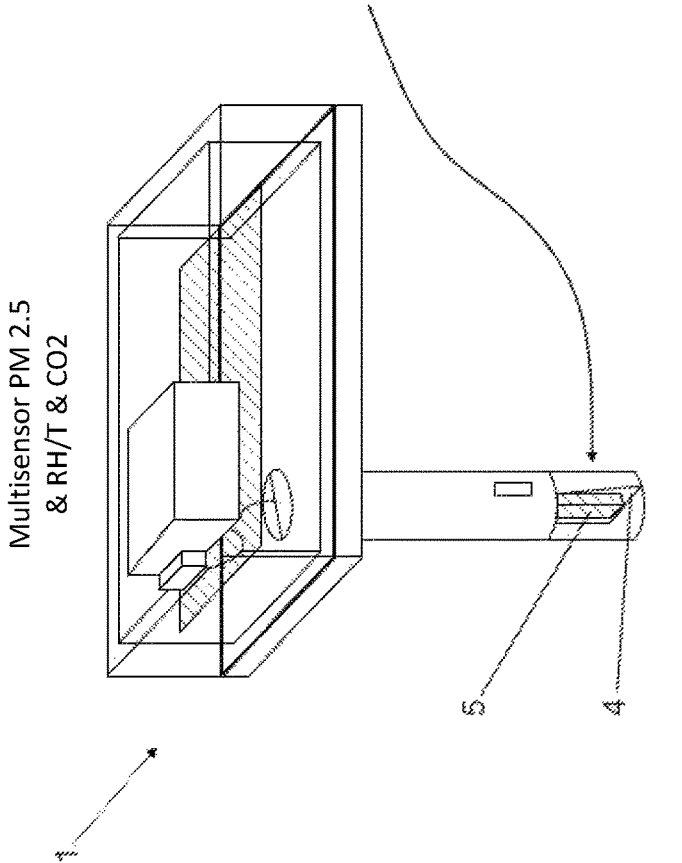
FIG. 8 is a schematic view of a duct sensor in a HVAC application according to the present disclosure.

FIG. 8 shows another application of the present disclosure. Namely, the device 1 may be a duct sensor in a HVAC application. A duct sensor 1 has multiple (heat generating) sensor modules, e.g. CO2, VOC, PM, relative humidity (with heating function) sensors, etc. and a temperature sensor unit 4 close to the heat generating components as mentioned. The features described above can be transferred to any application of the temperature correction according to the present disclosure.

The following enumerated paragraphs describe further features and suitable combinations of the present disclosure:

A1. A device (1) comprising at least one heat generating component, wherein the device (1) has a temperature sensor unit (4) comprising an electrical circuit comprising:

a first resistor (41) having a negative temperature coefficient (first NTC resistor) and a first operation characteristic referring or corresponding to a relation between the ambient temperature of the first resistor (41) and a first electrical resistance (R1) of the first resistor (41); and a compensation circuit (42) comprising at least a second resistor, wherein the compensation circuit (42) has a second operation characteristic referring or corresponding to a relation between the ambient temperature of the compensation circuit (42) and a second electrical resistance (R2) of the compensation circuit (42);

wherein the compensation circuit (42) is provided for compensating a deviation, caused by self-heating effects of the device (1), of the measured first electrical resistance (R1) from the electrical resistance (Req) referring or corresponding to room temperature.

A2. The device (1) of A1, wherein a second electrical resistance (R2) of the compensation circuit (42) at a predetermined temperature represents the deviation of the measured first electrical resistance (R1) at the predetermined temperature from the electrical resistance (Req) referring or corresponding to room temperature.

A3. The device (1) of A1 or A2, wherein the compensation circuit (42) is arranged in series with the first resistor (41), or parallel to the first resistor (41), or in a network with the first resistor (41).

A4. The device (1) of any one of A1 through A3, wherein the compensation circuit (42) compensates the deviation of the measured first electrical resistance (R1) at a first temperature from the electrical resistance (Req) referring or corresponding to room temperature, by adding an electrical resistance (R2) at the predetermined temperature to the temperature dependent resistance (R1) of the first resistor (41) at the predetermined temperature.

A5. The device (1) of any one of A1 through A4, wherein the compensation circuit (42) substantially consists of a second resistor connected in series with the first resistor (41).

A6. The device (1) of any one of A1 through A5, wherein the at least one heat generating component, the first resistor, and the compensation circuit are in close proximity to each other.

A7. The device (1) of any one of A1 through A6, wherein the at least one heat generating component, the first resistor, and/or the compensation circuit are arranged in a housing.

A8. A method of determining room temperature using an analog sensor unit (4) which is in proximity to at least a component of a device (1) generating heat, comprising the steps of:

(a) determining a third electrical resistance (Req) which is a combination of a first electrical resistance (R1) arranged in the device (1), and a second electrical resistance (R2) of a compensation circuit (42);

(b) determining a temperature based on the third electrical resistance (Req) which corresponds to room temperature by compensating self-heating effects of the at least one component of the device (1).

A9. The method of A8, wherein in step (a) the first electrical resistance (R1) and the second electrical resistance (R2) of the compensation circuit are added.

A10. The method of A8 or A9, wherein a first resistor (41) providing the first electrical resistance (R1) and/or a second resistor (42) providing the second electrical resistance (R2) are NTC (negative temperature coefficient) resistors.

A11. The method of any one of A8 through A10, wherein step (b) includes using a first operation characteristic referring or corresponding to a relation between the ambient temperature of the first NTC resistor and the first electrical resistance (R1) in order to determine a third temperature (Teq) corresponding to added values of the first electrical resistance (R1) and the second electrical resistance (R2).

The invention claimed is:

1. A device including at least one heat generating component, wherein the device has a temperature sensor unit having an electrical circuit comprising:

a first resistor having a negative temperature coefficient and a first operation characteristic corresponding to a relation between the ambient temperature of the first resistor and a first electrical resistance of the first resistor; and a compensation circuit comprising at least a second resistor, wherein the compensation circuit has a second operation characteristic corresponding to a relation between the ambient temperature of the compensation circuit and a second electrical resistance of the compensation circuit;

wherein the compensation circuit is configured to compensate a deviation, caused by self-heating effects of the device, of the measured first electrical resistance from the electrical resistance corresponding to a room temperature.

2. The device of claim 1, wherein the second electrical resistance of the compensation circuit at a predetermined temperature represents the deviation of the measured first electrical resistance at the predetermined temperature from the electrical resistance corresponding to the room temperature.

3. The device of claim 1, wherein the compensation circuit is arranged in series with the first resistor.

4. The device of claim 1, wherein the compensation circuit is arranged in parallel with the first resistor.

5. The device of claim 1, wherein the compensation circuit is arranged in a network with the first resistor.

6. The device of claim 1, wherein the compensation circuit is configured to compensate the deviation of the measured first electrical resistance at a first temperature from the electrical resistance corresponding to the room temperature, by adding an electrical resistance at the predetermined temperature to the temperature dependent resistance of the first resistor at the predetermined temperature.

7. The device of claim 1, wherein the compensation circuit consists essentially of a second resistor connected in series with the first resistor.

8. The device of claim 1, wherein the at least one heat generating component, the first resistor, and the compensation circuit are in close proximity to each other.

9. The device of claim 1, wherein the at least one heat generating component, the first resistor, and/or the compensation circuit are arranged in a housing.

10. A method of determining a room temperature using an analog sensor unit in proximity to at least a component of a device generating heat, the method comprising:

(a) determining a third electrical resistance defined as a combination of a first electrical resistance arranged in the device, and a second electrical resistance of a compensation circuit;

(b) determining a temperature based on the third electrical resistance, wherein the determined temperature corresponds to the room temperature by compensating self-heating effects of the at least one component of the device.

11. The method of claim 10, wherein step (a) comprises adding the first electrical resistance and the second electrical resistance of the compensation circuit.

12. The method of claim 10, wherein a first resistor providing the first electrical resistance and/or a second resistor providing the second electrical resistance are negative temperature coefficient (NTC) resistors.

13. The method of claim 12, wherein step (b) includes using a first operation characteristic corresponding to a relation between the ambient temperature of the first NTC resistor and the first electrical resistance in order to determine a third temperature corresponding to added values of the first electrical resistance and the second electrical resistance.

* * * * *